United States Patent
Daniels-Barnes et al.

(10) Patent No.: US 6,665,705 B1
(45) Date of Patent: Dec. 16, 2003

(54) METHOD AND APPARATUS FOR PROXY REPLICATION

(75) Inventors: Fonda Jonette Daniels-Barnes, Cary, NC (US); Stephen Glen Graham, Chapel Hill, NC (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/420,473

(22) Filed: Oct. 19, 1999

(51) Int. Cl.$^7$ ............................................. G06F 15/16
(52) U.S. Cl. ....................... 709/203; 709/213
(58) Field of Search ................. 709/205, 213, 709/214, 215, 216, 208, 248, 220; 714/4

(56) References Cited

U.S. PATENT DOCUMENTS

| | | | |
|---|---|---|---|
| 5,325,362 A | 6/1994 | Aziz | 370/94.3 |
| 5,740,176 A | 4/1998 | Gupta et al. | 370/440 |
| 5,793,965 A | 8/1998 | Vanderbilt et al. | 395/200 |
| 5,937,388 A | 8/1999 | Davis et al. | 705/8 |
| 6,058,424 A * | 5/2000 | Dixon et al. | 709/226 |
| 6,145,089 A * | 11/2000 | Le et al. | 714/4 |
| 6,226,684 B1 * | 5/2001 | Sung et al. | 709/203 |

OTHER PUBLICATIONS

Matsuda et al. U.S. Patent Application Publicaton, Pub. No. 2002/0133573.*

* cited by examiner

Primary Examiner—Zarni Maung
(74) Attorney, Agent, or Firm—Gregory M. Doudnikoff; Carstens, Yee & Cahoon, LLP

(57) ABSTRACT

A method and apparatus in a distributed data processing system for providing proxy services. Requests are processed by a primary proxy, using a shared memory in the distributed data processing system. A challenge from a secondary proxy to the primary proxy is detected. A determination is made as to whether the secondary proxy has priority over the primary proxy. This may be determined using priorities assigned to the proxies. Responsive to determining whether the secondary proxy has priority over the primary proxy, a priority of the secondary proxy is stored. Responsive to the secondary proxy having priority over the primary proxy, the secondary proxy to is allowed access the shared memory. Further, the secondary proxy is then allowed to multi-cast a message to clients indicating the secondary proxy's location. This message indicates that the secondary proxy is now the primary proxy.

30 Claims, 6 Drawing Sheets

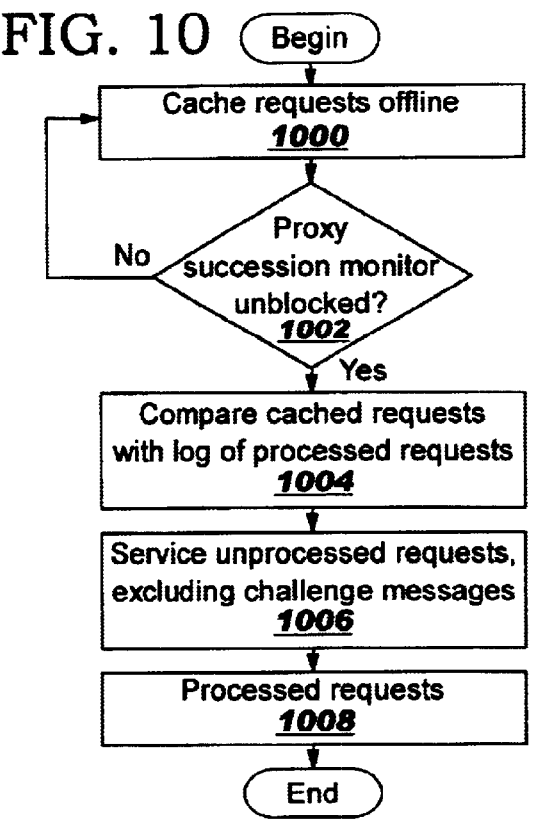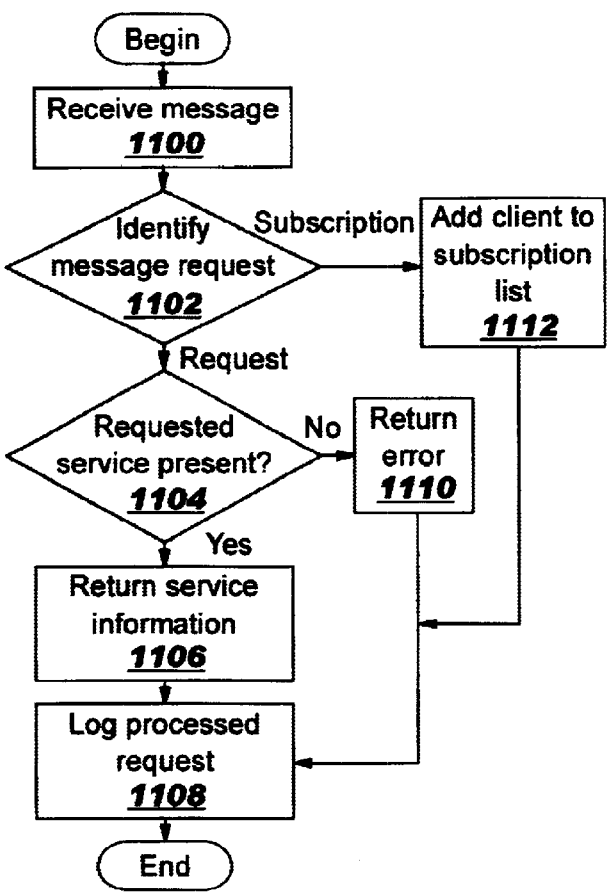

METHOD AND APPARATUS FOR PROXY REPLICATION

CROSS REFERENCE TO RELATED APPLICATIONS

The present invention is related to application entitled METHOD AND APPARATUS FOR SCALING UNIVERSAL PLUG AND PLAY NETWORKS USING ATOMIC PROXY REPLICATION, Ser. No. 09/420,700, now U.S. Pat. No. 6,571,277; which are filed even date hereof, assigned to the same assignee, and incorporated herein by reference.

BACKGROUND OF THE INVENTION

1. Technical Field

The present invention relates generally to an improved distributed data processing system and in particular to a method and apparatus for providing plug and play services in a distributed data processing system. Still more particularly, the present invention provides a method and apparatus for scaling proxy servers providing plug and play services in a distributed data processing system.

2. Description of Related Art

Plug and play in personal computers was brought about by a cooperative multiple-vendor effort to improve the personal computer platform by delivering a zero configuration peripheral connectivity. Such a system was first introduced in Microsoft Windows 95, which was offered by Microsoft Corporation. Universal plug and play (UPnP) is intended to bring zero-configuration features from plug and play to networks. Universal plug and play reuses existing protocols in technology, such as Internet Protocol (IP). The standards used in universal plug and play are open Internet standards.

UPnP includes a service discovery mechanism to support spontaneous networking. In other words, devices and software services dynamically avail themselves to the network. UPnP network topologies include three categories of network entities. These three categories are services, proxies, and clients. Services may be hardware or software based services. Proxies work like a registry of services that are available. Clients include any network entity, which requires a service. The protocol used in UPnP to perform service look up and discovery is Simple Service Discovery Protocol (SSDP).

SSDP services announce themselves to the network via ssdp:alive messages. The ssdp:alive message defines the service type, unique service name (i.e. uuid), location(s) of the service via universal resource identifiers (URIs), and caching information (i.e. max-age).

SSDP proxies monitor ssdp:alive messages on the reserved SSDP multicast channel. Multicast is a mechanism for sending a single message to multiple recipients. Universal plug and play involves the use of multicast domain name system (DNS) requests. These types of requests allow a machine to see requests for its name and respond to the requests. Multicast DNS is used when a DNS server is unavailable.

As services notify the network that they exist, the proxy maintains a cache of the registered services. This cache is also referred to as a "network cache". The network cache persists the data transmitted by the ssdp:alive messages broadcast by each service. Proxies employ a cache replacement policy such that service entries are deleted when the time interval between subsequent ssdp:alive transmissions exceeds that indicated by the services advertised maximum age. A network cache can be regarded as a dynamic database supporting the service listing facility conveyed by the SSDP proxy.

SSDP proxies are also SSDP service in that they must first announce their presence on the network and attempt to discover an existing proxy. If a proxy is detected, a proxy election algorithm is applied to resolve the new primary proxy. According to the current SSDP specification, there can be only one primary proxy on any UPnP network.

UPnP clients must discover the primary proxy in order to use it. Clients use the same mechanism to discover a primary proxy as they use to discover any other service. Clients use the primary proxy to discover the set of services it requires. Clients leverage SSDP search and subscribe messages to locate and monitor services.

SSDP leverages the Internet group management protocol for IP multicast support. Internet Group Management Protocol (IGMP) messages are not forwarded to multiple multicast routers, thus bounding UPnP networks to a single subnet. More information on IGMP may be found in rfc 2236 at http://www.ietf.org maintained by the Internet Engineering Task Force (IETF). UPnP networks support only a single primary proxy per subnet. All other viable proxies behave as "aproxies" sitting idle on the network until such time, as the primary proxy is no longer available. A primary proxy can become unavailable due to network failures, being overrun with client requests, hardware failure, or when the proxy sends an ssdp:byebye message. Proxy unavailable is detected like any other service's unavailability when it no longer issues ssdp:alive messages. When the primary proxy expires the UPnP network reconfigures itself by electing a new proxy from the set of idle "aproxies". The aproxies challenge one another until a dominant proxy is resolved as the primary proxy. Proxies which failed to satisfy all challenges resume the role of aproxy.

A newly elected primary proxy must determine the set of services that are available on the network, by issuing a ssdp:notproxyaware SEARCH message. After receiving the ssdp:notproxyaware SEARCH message, services respond with ssdp:alive messages, such that the new primary proxy may initialize its cache. Clients reissue ssdp:discovery and subscribe requests to the newly elected proxy in order to monitor relevant services, all clients must then discover the proxy in which to access services. The process as described in the SSDP specification has several drawbacks: (1) clients are indefinitely delayed from discovering proxied services; (2) services must reestablish network presence, due to loss of caching information; (3) proxies make inefficient use of network resources by challenging one another; (4) service expiration goes undetected in the absence of a primary proxy; and (5) UPnP networks do not scale to support multiple SSDP proxies. Further, failure of the primary proxy is visible to all resources on the network (i.e. clients, services, and aproxies).

Therefore, it would be advantageous to have an improved method and apparatus for providing proxy services in a distributed data processing system.

SUMMARY OF THE INVENTION

The present invention provides a method in a distributed data processing system for providing proxy services. Requests are processed by a primary proxy, using a shared memory in the distributed data processing system. A challenge from a secondary proxy to the primary proxy is detected. A determination is made as to whether the secondary proxy has priority over the primary proxy. This may be determined using priorities assigned to the proxies. Responsive to determining whether the secondary proxy has priority over the primary proxy, a priority of the secondary proxy is stored. Responsive to the secondary proxy having priority over the primary proxy, the secondary proxy to is allowed access the shared memory. Further, the secondary proxy is then allowed to multi-cast a message to clients indicating the secondary proxy's location. This message indicates that the secondary proxy is now the primary proxy.

In the event, that the secondary proxy fails to win the challenge, requests are cached by the secondary proxy. These are requests that are processed by the primary proxy. These processed requests are stored by the primary proxy in the shared memory The secondary proxy monitors to see if the secondary proxy is selected to become the primary proxy. Responsive to the secondary proxy being selected to become the primary proxy, the new primary proxy compares cached requests with processed requests in the shared memory to identified unprocessed requests. Requests identified as being unprocessed requests are serviced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a flowchart of a process followed by an aproxy depicted in accordance with a preferred embodiment of the present invention;

FIG. 11 is a flowchart of a process for processing a request for a service from a client depicted in accordance with a preferred embodiment of the present invention;

FIG. 12 is a flowchart of a process for registering services depicted in accordance with a preferred embodiment of the present invention;

DETAILED DESCRIPTION OF THE PREFERRED EMBODIMENT

Figure 1:
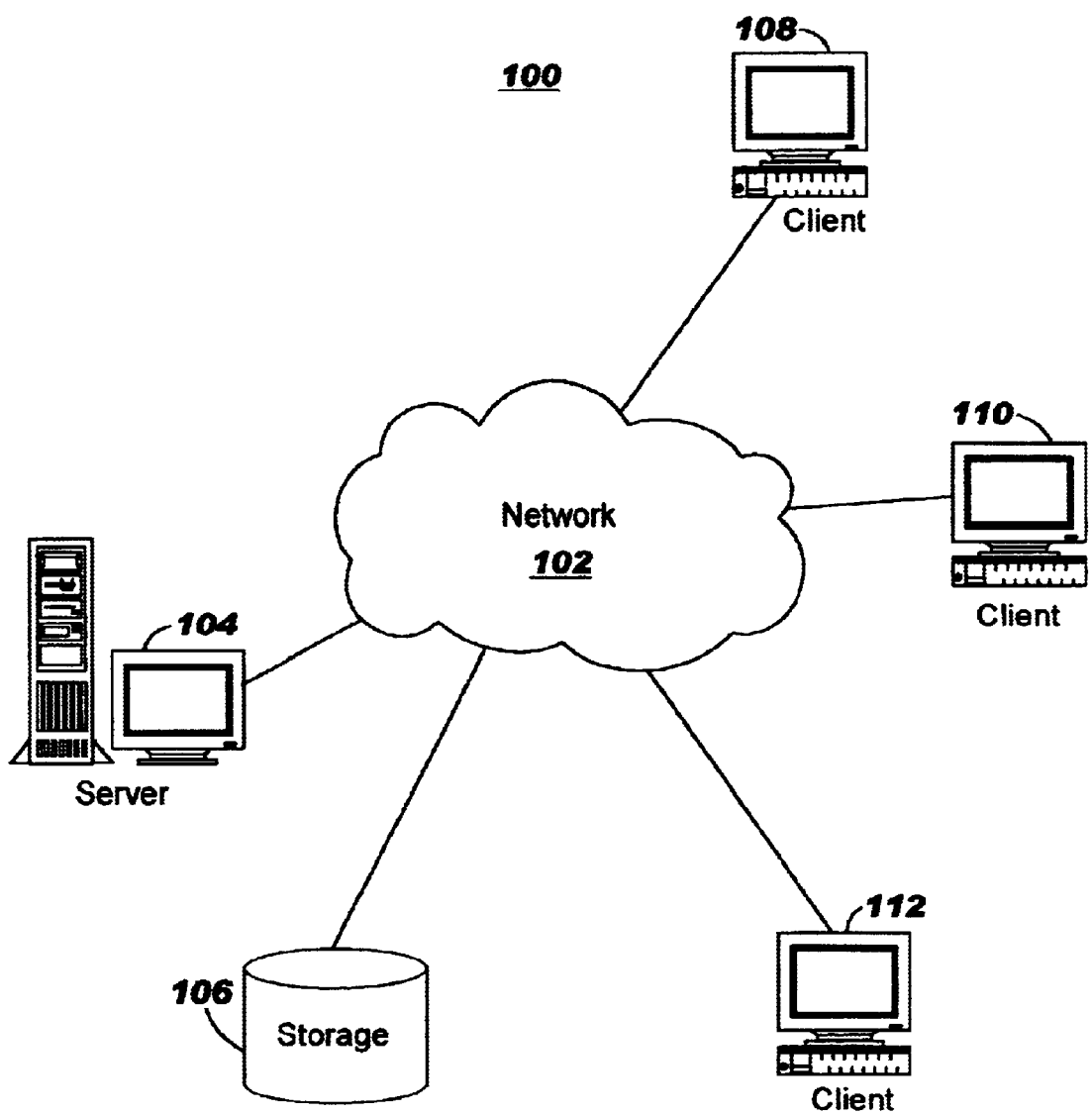
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 a server 105 is connected to network 102 along with storage unit 106. Server 104 and server 105 may be used to implement proxy services or services while storage 106 may be used as a network cache. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
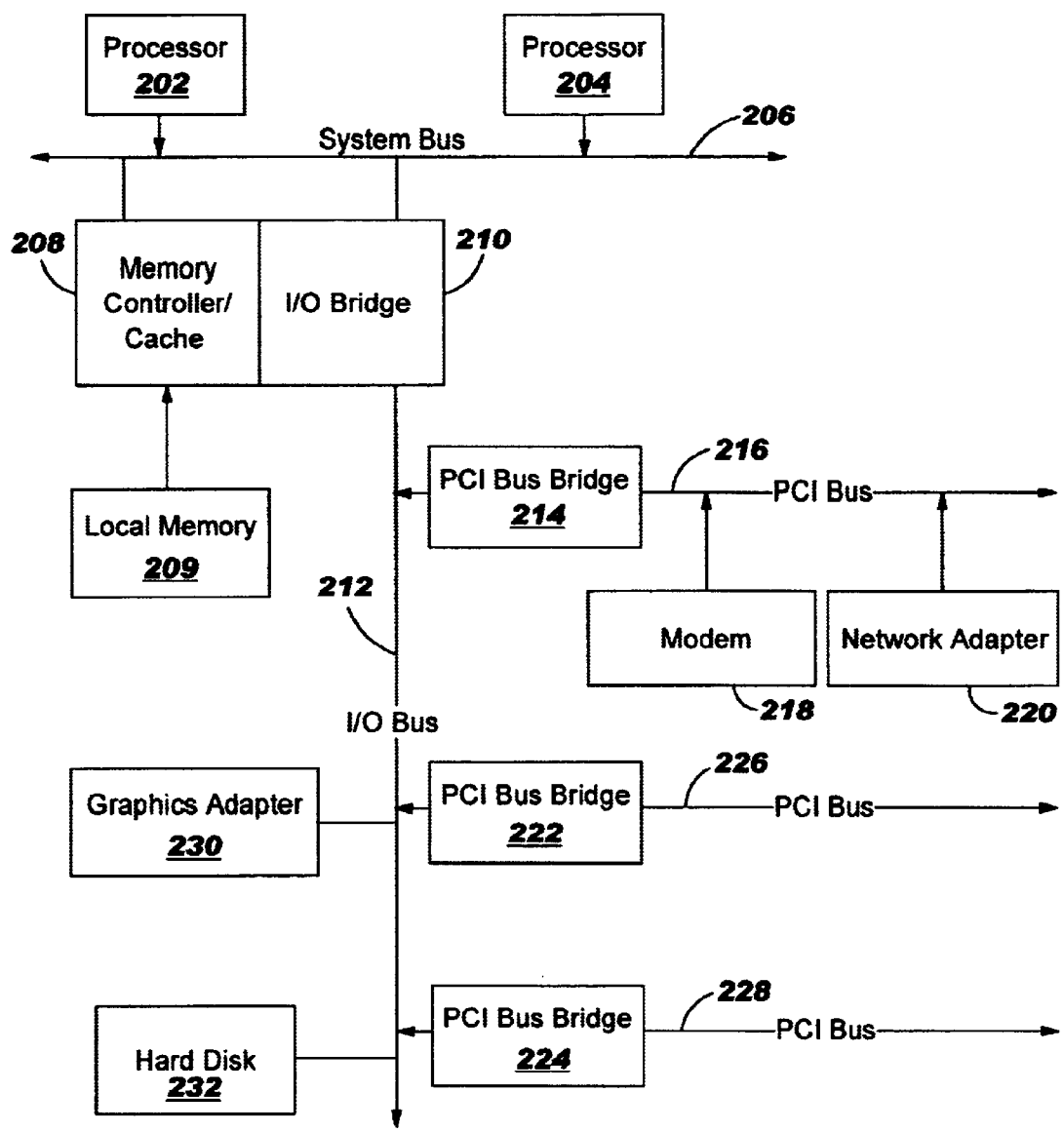
FIG. 2 is a block diagram depicting a data processing system that may be implemented as a server depicted in accordance with a preferred embodiment of the present invention.

Referring to FIG. 2, a block diagram depicts a data processing system that may be implemented as a server, such as server 104 in FIG. 1, in accordance with a preferred embodiment of the present invention. data processing system 200 may function both as a proxy or as an aproxy in these examples. Additional data processing system 200 may implement or house a service. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

The present invention provides a method, apparatus, and computer implemented instructions for providing proxies in a distributed data processing system. The mechanism of the present invention may be triggered by the failure of a primary proxy. This failure induces an atomic replication of the failed primary proxy with a secondary proxy also called an aproxy. This replication is performed in a manner such that the transition is transparent to services and clients. Further, the present invention provides a mechanism in which multiple proxies may be provided to service requests and appear as a single proxy to the clients and services. This mechanism includes time slicing in which the proxies providing the service all use the same unique service name (USN) with different locations. The time slicing or transitioning of proxies as a primary proxy is implemented in the examples using the proxy replication mechanism for a failed proxy.

Figure 3:
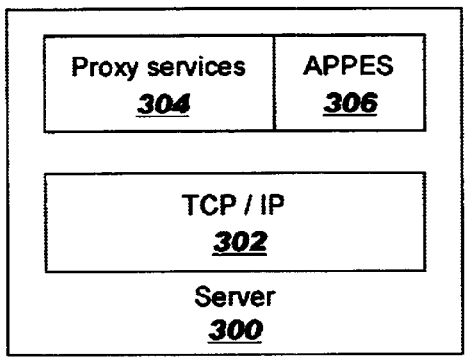
FIG. 3 is a block diagram of components in a server depicted in accordance with a preferred embodiment of the present invention.

With reference now to FIG. 3, a block diagram of components in a server is depicted in accordance with a preferred embodiment of the present invention. In this example server 300 may either be a proxy or an aproxy. Each server includes a TCT/IP layer 302, which is used to communicate across a network, such as network 102 in FIG. 1. Proxy services 304 is used to provide proxy services to respond to request from clients and to identify and list services. Asynchronous priority prioritized proxy election service (APPES) 306 is found in each server and provides processes to handle challenges by new aproxy servers entering a network. When APPES 306 is located in the proxy, as opposed to an aproxy, the APPES is active. When located in an aproxy, APPES 306 is idle and will perform offline caching of SSDP challenges. In this example, APPES 306 is implemented as a SSDP service residing on the same system as a SSDP proxy service.

The process of proxy election is shared between distributed proxies and aproxies in these examples. APPES 306 when located in the current proxy is responsible for responding to challenges by aproxies attempting to join the UPnP network. This service is responsible for employing a proxy election algorithm when aproxies come online and resolving proxy priorities. APPES 306 enforces the rule P(a)>P(b) if a # b=a. For example, the priority of proxy "a" is greater than that of proxy "b's" if and only if proxy "b" is challenged by proxy "a" results in proxy "a" winning the challenge. The same result occurs for the reverse situation.

Figure 4:
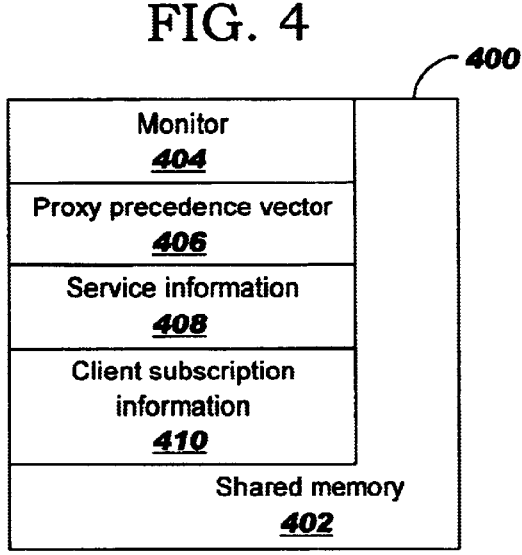
FIG. 4 is a block diagram of a network cache depicted in accordance with a preferred embodiment of the present invention.

With reference now to FIG. 4, a block diagram of a network cache is depicted in accordance with a preferred embodiment of the present invention. Network cache 400 is a shared memory system that may be accessed by different servers that become proxy servers. In this manner, creation of a new cache and requiring clients and services to reregister is avoided because a new proxy server may take over the network cache 400 from a prior proxy server.

Network cache 400 includes a shared memory 402 and a monitor 404. Shared memory 402 may take various forms depending on the implementation. For example, without limitation, shared memory 402 may be in the form of hard disk drives, random access memory, or a combination of the two. Monitor 404 serves to provide access to the proxy while blocking access to aproxies. Monitor 404 also provides the primary APPES read/write access while all other APPES services have read-only access.

Proxy precedence vector 406 represents the aggregation of each proxies respective priority. Primary APPES 306 in FIG. 3 generates a unique proxy rank for registered proxies, and updates cached proxy precedence vector 406 to reflect the relative priority of the registered proxies. Proxy precedence vector 406 alleviates the need for further proxy challenges by maintaining a logical representation of proxy precedence. APPES 306 in FIG. 3 persists proxy precedence vector 406 in network cache 400, as opposed to a local cache, to circumvent a single point of failure condition, when the primary proxy fails.

In addition, network cache 400 also includes service information 408 and client subscription information 410. Service information 408 contains information about services registered with the proxy. This information is returned to clients in response to requests for services registered with the proxy. Client subscription information 410 contains information about clients registered with the proxy. This information may be used to send messages to clients. For example, if a set of clients request a service that is unavailable, these clients may be registered in the client subscription information such that they are sent a multicast message when the service becomes available.

The primary proxy stores processed requests in network cache 400. Services issue ssdp:alive messages to announce their presence to the network. These ssdp:alive messages are retransmitted intermittently as an indicator that the service has not expired. When the primary proxy processes an ssdp:alive message for a service which is not registered, a service entry is cached which persists the data contained in the ssdp:alive message. The cached service entry located in shared memory 402 stores the service type, unique service name, location, alternate locations, and expiration time. The expiration time indicates the time in which the service will be considered expired, barring the reception of a subsequent ssdp:alive message.

In the depicted example, all proxies have a consistent view of time to facilitate atomic replication. Upon failure of the primary proxy, service expiration is detected by the new primary proxy using a network time service, which provides a consistent view of time to aproxies. The network time service may be implemented using various standard time protocols, such as, for example, the network time protocol and Internet clock service. When a ssdp:alive message is received from a registered service, the corresponding service entry is updated in network cache 400 with a new expiration time.

Client ssdp:discovery request messages are processed by the proxy. The proxy returns ssdp:alive messages on behalf of the requested service when the client subscribes to the discovered service. The content of the ssdp:alive message is formatted from the cached service entry. The client request is cached, to indicate successful completion of the client ssdp:discovery request. The cached request indicates that the primary proxy has successfully processed the request. Further, subscribe messages received from a client indicate an interest by the client in receiving service heart beats for a specified service type. These requests are stored in the network cache as client information.

In the system defined in the depicted example, aproxies no longer sit idle on the network while the primary proxy service requests. Aproxies cache all client and service SSDP httpmu (i.e. multicast) messages. Aproxies remove locally cached entries which are successfully processed by the proxy. When all aproxies remove the request from their local cache, the network cache entry is removed as well. This data redundancy allows a newly elected proxy to respond to client requests and service updates that were issued prior to the proxy election process.

When the proxy becomes unavailable, proxy election occurs. In the presence of APPES 306 in FIG. 3, proxy succession is resolved by removing the proxy entry from the new proxy, which is reelected or selected using the proxy precedence vector. The newly anointed primary proxy assumes the cached unique service name as its own, and issues a ssdp:alive message where the alternate location header indicates the new primary proxy's universal resource identifier (URI), http:\\primary.proxy2.ibm.com.

Clients will switch to the new URI transparently due to the consistency in unique service name. As defined by the SSDP, services are uniquely identified by their unique service name, thus the URI may change for the same service. This feature allows SSDP services to provide multiple access methods, such as, for example, HTTP and FTP. The generation of a new unique service name implies that the proxy cache is not consistent and forces clients and services to reissue ssdp:discover subscribe requests, and ssdp:alive announcements. After completion of this stage, the original proxy has been successfully replicated atomically.

The final stage of processing is to maintain consistency in the network. During proxy failure, requests may have been issued by services and clients. All functional aproxies cached these requests as mentioned above. Also, services may have issued ssdp:alive or ssdp:byebye messages, services may have expired, clients may have issued ssdp:discover requests, etc. The new proxy will process requests, which represent the difference between the local cache and network cache. This feature negates the need for clients and services to reissue any messages, due to a proxy failure. After processing the requests, the network cache is updated. This update reelects the fact that all outstanding requests have been processed. This update after a proxy failure results in the remaining aproxies removing the corresponding entries from their local cache's.

Figure 5:
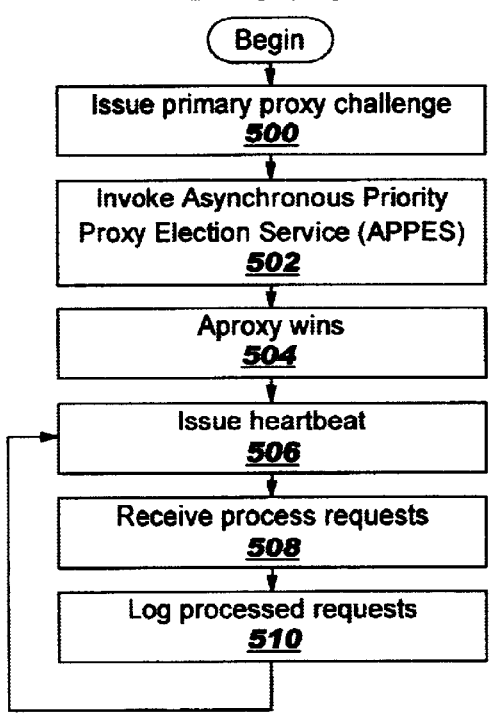
FIG. 5 is a flowchart of a process used by proxies depicted in accordance with a preferred embodiment of the present invention.

Turning next to FIG. 5, a flowchart of a process used by proxies is depicted in accordance with a preferred embodiment of the present invention. The process in FIG. 5 illustrates the initialization of the service as well as the process used after a first proxy has been selected.

The process begins with a first server issuing a primary proxy challenge (step 500). Thereafter, an asynchronous prioritized proxy election service (APPES) is initiated (step 502). APPES is used to handle challenges by new aproxies joining the network. Further, APPES also records priorities of each of the servers. In the depicted examples, these priorities are recorded in a vector containing the priority of the server, location, and internal USN. The first aproxy issuing the primary proxy challenge wins the contest (step 504). This always occurs when the network is initialized because the aproxy is the first one to join. Thereafter, the aproxy becomes the proxy and issues a heartbeat (step 506). The proxy generates a heartbeat by multicasting a message including the proxy's unique service name and location (i.e. IP address or URI).

The proxy receives and processes requests (step 508). The processed requests are logged (step 510) with the process then returning to step 506 as described above.

Figure 6:
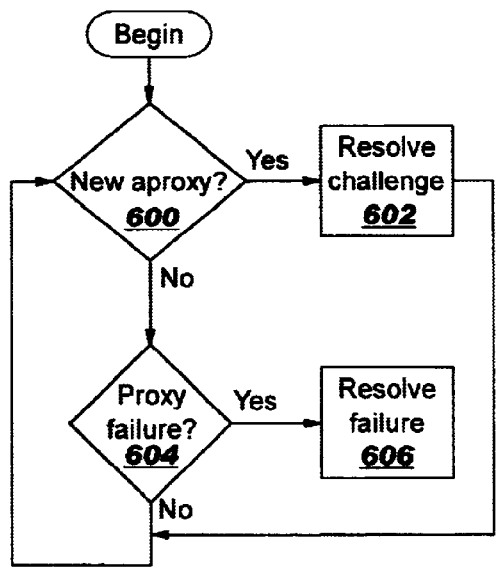
FIG. 6 is a flowchart of a process in an asynchronous prioritized proxy election service (APPES) for handling challenges and proxy failures depicted in accordance with a preferred embodiment of the present invention.

Turning next to FIG. 6, a flowchart of a process in an asynchronous prioritized proxy election service (APPES) for handling challenges and proxy failures is depicted in accordance with a preferred embodiment of the present invention. After the first proxy has been initialized, challenges may come from other servers joining the network.

The process begins with a determination as to whether a new aproxy has joined the network (step 600). If a new aproxy has joined the network, a challenge by the aproxy is resolved (step 602) with the process returning to step 600 thereafter. The APPES will resolve the challenge between the aproxy and the proxy. Step 602 is described in more detail below in FIG. 7.

With reference again to step 600, if a new a proxy has not joined the network, a determination is made as to whether a proxy failure has occurred (step 604). This determination is made in these examples by monitoring the "heartbeat" of the proxy. The heartbeat is generated using messages that are periodically multicast by the proxy. This monitoring is performed by a monitor, such as monitor 404 in FIG. 4. If a proxy failure has occurred, the failure is resolved (step 606). Step 606 is described in more detail below in FIG. 9. The resolution is performed by the monitor includes selecting the new proxy. After resolution of the failure the process returns to step 600 as described above. If a proxy failure is absent, the process also proceeds to step 600.

Figure 7:
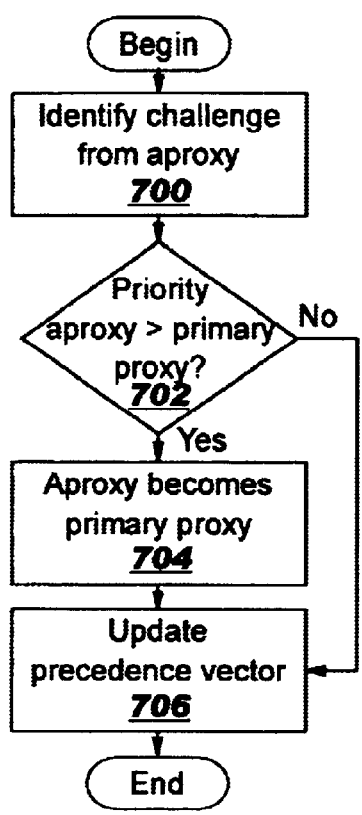
FIG. 7 is a flowchart of a process for resolving a challenge by an aproxy depicted in accordance with a preferred embodiment of the present invention.

Turning next to FIG. 7, a flowchart of a process for resolving a challenge by an aproxy is depicted in accordance with a preferred embodiment of the present invention. This process is tightly coupled to the network cache and is handled by the APPES, which is distributed in all servers in these examples.

The process begins by identifying the challenge from the aproxy (step 700). This identification includes identifying the priority and USN of the aproxy. In these examples, the priority is a number between from 0.0 to 1.0. Of course other ranking schemes may be used depending on the implementation. Next, a determination is made as to whether the priority of the aproxy is greater than the priority of the primary proxy (step 702). If the priority of the aproxy is greater than the proxy, the aproxy becomes the proxy (step 704). If both priorities are equivalent a byte comparison of the unique service names for the aproxy and the proxy determines the winner. The unique name service byte comparison, guarantees only one winner. This change allows the new proxy to have access to the network cache and broadcast messages using the unique service name. This designation will result in the monitor unblocking the aproxy because this server is now the proxy. The precedence vector is updated (step 706) with the process terminating thereafter. The update in step 706 records the priority of the new server as well as identification information of the new server. This identification information includes the unique service name and location of the server. The unique service name is used by the monitor to identify the calling aproxy. With reference again to step 702, if the aproxy does not have a greater priority than the proxy, the proxy is not replaced and the process proceeds directly to step 706 as described above unless the unique service name has a greater byte value than the current proxy. The unique service names are compared only when the priorities are equal.

Figure 8:
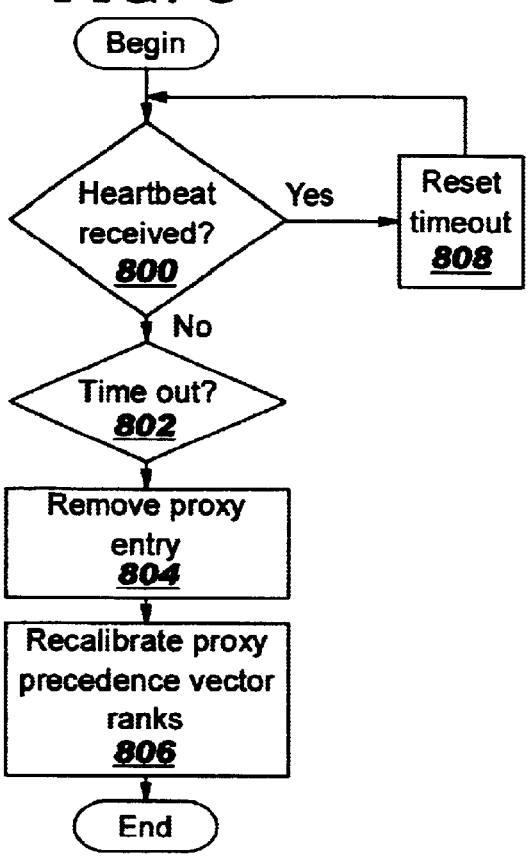
FIG. 8 is a flowchart of a process used to monitor for failure of a proxy depicted in accordance with a preferred embodiment of the present invention.

Turning next to FIG. 8, a flowchart of a process used to monitor for failure of a proxy is depicted in accordance with a preferred embodiment of the present invention. This process may be implemented in a monitor in the depicted examples. The process begins by determining whether a heartbeat message has been received from the proxy (step 800). If a heartbeat has not been received, a determination is made as to whether a timeout has occurred (step 802). If a timeout has not occurred, the process returns to step 800. Otherwise, a proxy failure has occurred and the proxy entry for the failed proxy is removed from the proxy precedence vector (step 804). Next, the proxy precedence vector is recallabrated (step 806) with the process terminating thereafter.

With reference again to step 800, if a heartbeat has been received from the proxy, the timeout is reset (step 808). The process then returns to step 800.

Figure 9:
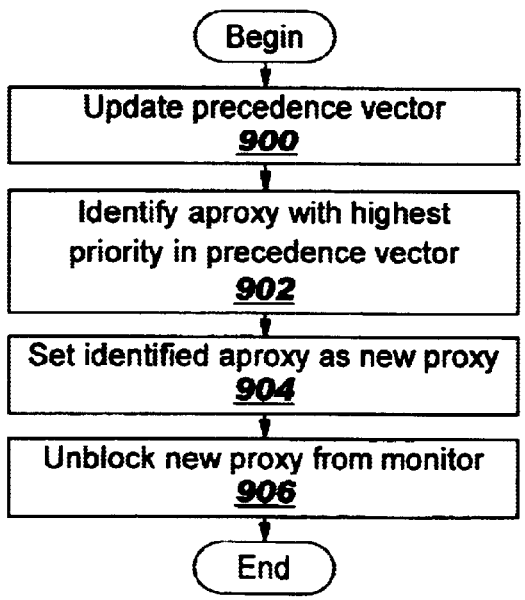
FIG. 9 is a flowchart of a process for resolving a proxy failure depicted in accordance with a preferred embodiment of the present invention.

With reference next to FIG. 9, a flowchart of a process for resolving a proxy failure is depicted in accordance with a preferred embodiment of the present invention. The process beings by updating the precedence vector (step 900). In this example, the precedence vector is updated to remove the failed proxy. Alternatively an indication may be made in the vector that the proxy has failed. Next, the aproxy with the highest priority in the proxy precedence vector is identified (step 902). This identified aproxy is set or designated as the new proxy (step 904), and the new proxy is unblocked from the monitor (step 906) with the process terminating thereafter.

Turning next to FIG. 10, a flowchart of a process followed by an aproxy is depicted in accordance with a preferred embodiment of the present invention. The process begins with the aproxy caching requests offline (step 1000). The requests are cached locally for each aproxy in these examples. This caching of requests are those requests that are multicast by clients or services. Requests made directly to the proxy are not cached by the aproxy. A determination is made as to whether the proxy succession monitor has unblocked the aproxy (step 1002). Unblocking of the aproxy would mean that the aproxy has become the proxy. If the aproxy has not been unblocked, the process returns to step 1000 to cache requests.

With reference again to step 1002, if the aproxy is unblocked, the aproxy becomes the new proxy and the requests cached by the new proxy are compared with the log of process requests in the network cache (step 1004). This comparison is made to identify requests made by clients and services that were not processes by the prior proxy. These requests, as mentioned above, are those multicast by a client or service. The process does not take into account request made directly by the prior proxy. With a direct connection using HTTP requests, these requests are not accounted for because the client or service will resend the request if the response by the proxy is not received. With multicast requests, the client or service does not expect a response. As a result, with multicast requests, the new proxy checks to see if requests were received that have been unprocessed. The unprocessed requests are serviced (step 1006). Challenge messages are excluded from the unprocessed requests in step 1006. When processed, these requests are logged in the network cache (step 1008) with the process terminating thereafter.

Turning next to FIG. 11, a flowchart of a process for processing a request for a service from a client is depicted in accordance with a preferred embodiment of the present invention. The process begins by receiving a message from the client (step 1100). The message type is identified (step 1102). In this example, the message may be a request message or a subscription message. A request message is a request for a service while a subscription message is a request for notification of service types and service heartbeats.

If the message is a request message, a determination is made as to whether the requested service is present (step 1104). If the requested service is present, information about the service is returned to the client (step 1106). The process request is then logged in the network cache (step 1108) with the process terminating thereafter. On the other hand, if the requested service is not present in step 1104, an error message is returned to the client (step 1110) with the process then proceeding to step 1108.

With reference again to step 1102, if the message is a subscription message, the client sending the message is added to the subscription list (step 1112) with the process then proceeding to step 1108.

Clients may issue subscribe messages for specified service types. Thus, when services of interest become available the proxy can inform the client of the availability of the services. Subscribe messages are also issued by clients so that proxies will forward service heart beats to interested clients.

With reference now to FIG. 12, a flowchart of a process for registering services is depicted in accordance with a preferred embodiment of the present invention. The process begins by receiving an alive message (step 1200). Service information is stored in the network cache (step 1202). The service information includes, for example, the service's unique service name, the type of service, the location of the service, and a time out value. An expiration time is set based on the time out value (step 1204). A similar process may be used to register clients with the proxy. Thereafter, a subscription is checked to see if clients have registered to receive messages for this type of service (step 1206). A multicast message is sent to all clients registered for the service type (step 1208) with the process terminating thereafter.

Figure 13:
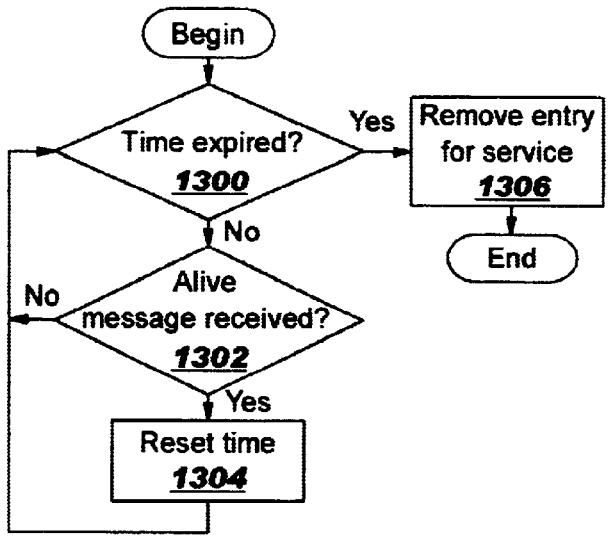
FIG. 13 is a flowchart of a process for managing registered services depicted in accordance with a preferred embodiment of the present invention.

Turning next to FIG. 13, a flowchart of a process for managing registered services is depicted in accordance with a preferred embodiment of the present invention. The process begins by determining whether the time set by time out value for the service has expired (step 1300). If the time has not expired, a determination is made as to whether an alive message has been received from the service (step 1302). This alive message is similar to the heartbeat generated by the proxy. If an alive message has been received, the time is reset (step 1304) with the process then returning to step 1300. Otherwise, the process returns directly to step 1300. With reference again to step 1300 if the time has expired, the entry for the service is removed (step 1306) with the process terminating thereafter.

In addition to using the processes described above to replace a failed proxy, these replication processes also may be used to enable multiple proxies to service clients and services with the clients and services seeing only a single proxy. In essence, the presentation of one proxy on the network at a time is extended by the present invention to having one proxy present during a single time slot.

In the depicted example, a round robin scheme is employed in which proxy priorities are a function of time. The proxy precedence vector described above acts as a proxy dispatcher, analogous to thread dispatchers common in operating system architectures. Each proxy is allowed a "slice" of time to access the network cache and issue a heartbeat. The location of the proxies differs, but the unique service name remains the same in the heartbeat or alive messages. All of these proxies are able to respond to requests. The clients and services see only a single proxy because all of the proxies issue heartbeat or alive messages using the same unique service name. The period of time allocated may be the same or different for each proxy depending on the allocation or arbitration scheme used.

Figure 14:
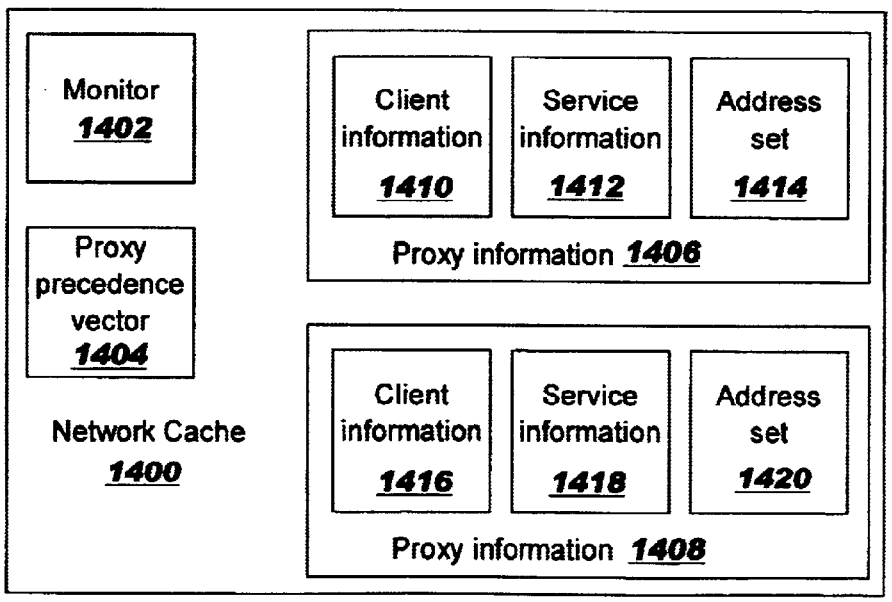
FIG. 14 is a block diagram of information stored in a network cache used in scaling a universal plug and play network depicted in accordance with a preferred embodiment of the present invention.

With reference now to FIG. 14, a block diagram of information stored in a network cache used in scaling a universal plug and play network is depicted in accordance with a preferred embodiment of the present invention. Network cache 1400 includes a monitor 1402 and a proxy precedence vector 1404 as in FIG. 4 above. The service information and client information in this examples grouped by proxies. Group 1406 contains proxy information for one proxy while group 1408 contains proxy information for another proxy. In particular, group 1406 contains client information 1410, service information 1412, and address set 1414. Similarly, group 1408 contains client information 1416, service information 1418, and address set 1420. The client information is that of clients registered for each particular proxy. The service information is that maintained by each proxy. The address set contains the IP address of all clients and services which are managed by the proxy in question. The proxy heart beat is issued to this set of addresses. A proxy is allowed access only to the information associated or assigned to the proxy. Although this example illustrates only two groups for two proxies, additional groups may be stored in network cache 1400 to support additional proxies.

Figure 15:
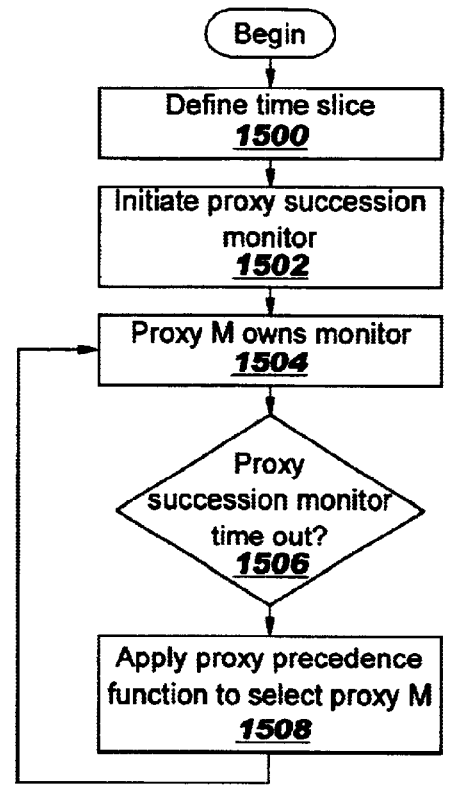
FIG. 15 is a flowchart of a process for scaling a universal plug and play network through atomic proxy replication depicted in accordance with a preferred embodiment of the present invention.

Turning now to FIG. 15, a flowchart of a process for scaling a universal plug and play network through atomic proxy replication is depicted in accordance with a preferred embodiment of the present invention. The process begins by defining the time slice (step 1500). In this example, the time slice is equal for each proxy, but unequal time slices may be assigned depending on the implementation. The proxy secession monitor is initiated with an appropriate time out based on the defined time slice (step 1502). Proxy M owns the monitor (step 1504). M is the identification of the current server that is functioning as the proxy for this time slice. A determination is made as to whether proxy secession has timed out (step 1506). If the monitor has not timed out, the process returns to step 1504.

Otherwise, a proxy precedence function is applied to select the new proxy to be identified as proxy M (step 1508) with the process then returning to step 1504. In this example, the proxy precedence function is (a+1)mod(x), where a is the current proxy number and x is the number of proxies/aproxies in the system. This function is basically a round robin function in which each aproxy is given a turn. Of course other functions such as those providing priorities or weights to selected aproxies may be used.

Further, different proxies may be assigned to different groups of clients and services such that more clients and services may be supported. This type of support may be implemented by having different proxies multicasting heart beats to different sets of clients. For example, one proxy may multicast messages to a first set of clients during its time slice while a second proxy multicast messages to a second set of clients during its time slice. When a proxy does not have a time period, it functions as an aproxy and will locally store requests fro it from clients and services. These requests will be processed when the time slice is received.

Aproxies also may be present. These aproxies function in the same manner as descrived above. With respect to failed proxies in the case of scaling or time slicing, the new proxy must assume the responsibilities of the failed proxy. The address list of the failed proxy is merged with that of the new proxy.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the processes of the present invention were illustrated using universal plug and play and SSDP services. These examples are for illustrative purposes of a preferred embodiment and not as limitations to the present invention. These processes may implemented using other architectures and discovery services. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for providing universal plug and play services, the method comprising:

processing requests, by a primary proxy, using a shared memory in the distributed data processing system;

detecting a challenge from a secondary proxy to the primary proxy;

determining whether the secondary proxy has absolute priority over the primary proxy;

responsive to the determining of whether the secondary proxy has absolute priority over the primary proxy, storing a priority of the secondary proxy; and responsive to the secondary proxy having absolute priority over the primary proxy, allowing the secondary proxy to access the shared memory.

2. The method of claim 1, wherein the primary proxy multi-casts a message indicating a presence of the primary proxy in the distributed data processing system and further comprising:

responsive to the secondary proxy having priority over the primary proxy, allowing the secondary proxy to multi-cast the message.

3. The method of claim 1, wherein the message includes a name and a location.

4. The method of claim 1, wherein the secondary proxy is an aproxy.

5. The method of claim 1, wherein the distributed data processing system is a universal plug and play network.

6. The method of claim 1, wherein the priority of the secondary proxy is stored in a data structure located in the shared memory.

7. The method of claim 6, wherein the data structure is a vector having a plurality of entries, wherein each entry includes a location of a secondary proxy, a unique identifier, and the priority of the secondary proxy.

8. The method of claim 6, wherein the data structure is a vector having a plurality of entries, wherein each entry includes a location of a secondary proxy and a unique identifier, and wherein the priority of the secondary proxy is indicated by a location of the entry relative to other entries within the plurality of entries.

9. The method of claim 1 further comprising:

responsive to the primary proxy having priority over the secondary proxy, caching requests to the primary proxy; and determining whether the secondary proxy is selected to become the primary proxy.

10. The method of claim 1, wherein the primary proxy stores processed requests in the shared memory and further comprising:

responsive to the secondary proxy being selected to become the primary proxy, comparing cached requests with processed requests in the shared memory to identified unprocessed requests; and servicing the unprocessed requests.

11. A method in a server for handling requests from a plurality of clients in a distributed data processing system, the method comprising:

generating a challenge to be a proxy server for providing universal plug and play services in the distributed data processing system;

responsive to a failure to become the proxy server, logging requests from the plurality of clients handled by the proxy server to form a set of logged requests;

monitoring for a change in status of the server to become the proxy server;

responsive detecting a change in status, comparing the set of logged requests to a set of processed requests in a shared memory to identify an unprocessed request; and responsive to identifying an unprocessed request, processing the unprocessed request.

12. The method of claim 11 further comprising:

responsive to detecting a change status, processing requests from the plurality of clients; and responsive to processing a request from the plurality of clients, logging request in the shared memory.

13. The method of claim 11 further comprising responsive to detecting a change in status, multi-casting a message including a name and a location, wherein the name identifies the server as the proxy server.

14. A method in a server for handling requests from a plurality of clients in a distributed data processing system, the method comprising:

generating a challenge to be a proxy server;

responsive to a failure to become the proxy server, logging requests from the plurality of clients handled by the proxy server to form a set of logged requests;

monitoring for a change in status of the server to become the proxy server;

responsive detecting a change in status, comparing the set of logged requests to a set of processed requests in a shared memory to identify an unprocessed request;

responsive to identifying an unprocessed request, processing the unprocessed request; and responsive to processing the unprocessed request, adding unprocessed request to the set of processed requests in the shared memory.

15. A distributed data processing system for providing universal plug and play services, the distributed data processing system comprising:

processing means for processing requests, by a primary proxy, using a shared memory in the distributed data processing system;

detecting means for detecting a challenge from a secondary proxy to the primary proxy;

determining means for determining whether the secondary proxy has absolute priority over the primary proxy;

storing means, responsive to the determining of whether the secondary proxy has absolute priority over the primary proxy, for storing a priority of the secondary proxy; and allowing means, responsive to the secondary proxy having absolute priority over the primary proxy, for allowing the secondary proxy to access the shared memory.

16. The distributed data processing system of claim 15, wherein the primary proxy multi-casts a message indicating a presence of the primary proxy in the distributed data processing system and further comprising:

second allowing means, responsive to the secondary proxy having priority over the primary proxy, for allowing the secondary proxy to multi-cast the message.

17. The distributed data processing system of claim 16, wherein the message includes a name and a location.

18. The distributed data processing system of claim 16, wherein the secondary proxy is an aproxy.

19. The distributed data processing system of claim 16, wherein the distributed data processing system is a universal plug and play network.

20. The distributed data processing system of claim 16, wherein the priority of the secondary proxy is stored in a data structure located in the shared memory.

21. The distributed data processing system of claim 20, wherein the data structure is a vector having a plurality of entries, wherein each entry includes a location of a secondary proxy, a unique identifier, and the priority of the secondary proxy.

22. The distributed data processing system of claim 20, wherein the data structure is a vector having a plurality of entries, wherein each entry includes a location of a secondary proxy and a unique identifier, and wherein the priority of the secondary proxy is indicated by a location of the entry relative to other entries within the plurality of entries.

23. The distributed data processing system of claim 16 further comprising:
   caching means, responsive to the primary proxy having priority over the secondary proxy, for caching requests to the primary proxy; and
   second selecting means for determining whether the secondary proxy is selected to become the primary proxy.

24. The distributed data processing system of claim 15, wherein the primary proxy stores processed requests in the shared memory and further comprising:
   comparing means, responsive to the secondary proxy being selected to become the primary proxy, for comparing cached requests with processed requests in the shared memory to identified unprocessed requests; and
   servicing means for servicing the unprocessed requests.

25. A server for handling requests from a plurality of clients in a distributed data processing system, the server comprising:
   generating means for generating a challenge to be a proxy server for providing universal plug and play services in the distributed data processing system;
   logging means, responsive to a failure to become the proxy server, for logging requests from the plurality of clients handled by the proxy server to form a set of logged requests;
   monitoring means for monitoring for a change in status of the server to become the proxy server;
   comparing means, responsive detecting a change in status, for comparing the set of logged requests to a set of processed requests in a shared memory to identify an unprocessed request; and
   processing means, responsive to identifying an unprocessed request, for processing the unprocessed request.

26. The server of claim 25 further comprising:
   second processing means, responsive to detecting a change status, for processing requests from the plurality of clients; and
   second logging means, responsive to processing a request from the plurality of clients, for logging request in the shared memory.

27. A server for handling requests from a plurality of clients in a distributed data processing system, the server comprising:
   generating means for generating a challenge to be a proxy server;
   logging means, responsive to a failure to become the proxy server, for logging requests from the plurality of clients handled by the proxy server to form a set of logged requests;
   monitoring means for monitoring for a change in status of the server to become the proxy server;
   comparing means, responsive detecting a change in status, for comparing the set of logged requests to a set of processed requests in a shared memory to identify an unprocessed request;
   processing means, responsive to identifying an unprocessed request, for processing the unprocessed request, and adding mean, responsive to processing the unprocessed request, for adding unprocessed request to the set of processed requests in the shared memory.

28. The server of claim 27 further comprising
   multi-casting means, responsive to detecting a change in status, for multi-casting a message including a name and a location, wherein the name identifies the server as the proxy server.

29. A computer program product in a computer readable medium for providing universal plug and play services in a distributed data processing system, the computer program product comprising:
   first instructions for processing requests, by a primary proxy, using a shared memory in the distributed data processing system;
   second instructions for detecting a challenge from a secondary proxy to the primary proxy;
   third instructions for determining whether the secondary proxy has absolute priority over the primary proxy;
   fourth instructions, responsive to the determining of whether the secondary proxy has absolute priority over the primary proxy, for storing a priority of the secondary proxy; and
   fifth instructions, responsive to the secondary proxy having absolute priority over the primary proxy, for allowing the secondary proxy to access the shared memory.

30. A computer program product in a computer readable medium for handling requests from a plurality of clients in a distributed data processing system in a server, the computer program product comprising:
   first instructions for generating a challenge to be a proxy server for providing universal plug and play services in the distributed data processing system;
   second instructions, responsive to a failure to become the proxy server, for logging requests from the plurality of clients handled by the proxy server to form a set of logged requests;
   third instructions for monitoring for a change in status of the server to become the proxy server;
   fourth instructions, responsive detecting a change in status, for comparing the set of logged requests to a set of processed requests in a shared memory to identify an unprocessed request; and
   fifth instructions, responsive to identifying an unprocessed request, for processing the unprocessed request.

* * * * *